(12) United States Patent
Askey

(10) Patent No.: US 7,409,877 B2
(45) Date of Patent: Aug. 12, 2008

(54) DYNAMOMETER ADAPTER FOR MOTORCYCLES

(75) Inventor: Howard Wayne Askey, Halswell (NZ)

(73) Assignee: Red Rackhams Treasure Co., Ltd., Christchurch (NZ)

( * ) Notice: Subject to any disclaimer, the term of this patent is extended or adjusted under 35 U.S.C. 154(b) by 182 days.

(21) Appl. No.: 11/508,392

(22) Filed: Aug. 22, 2006

(65) Prior Publication Data

US 2008/0047357 A1 Feb. 28, 2008

(51) Int. Cl.
*G01L 3/16* (2006.01)
*G01L 3/00* (2006.01)
*G01M 17/00* (2006.01)

(52) U.S. Cl. .................. 73/862.09; 73/117.3; 73/862.08

(58) Field of Classification Search .................. 73/862, 73/862.08–862.09, 862.191, 862.29, 862.31, 73/117.2, 117.3
See application file for complete search history.

(56) References Cited

U.S. PATENT DOCUMENTS

| | | | |
|---|---|---|---|
| 4,196,617 A * | 4/1980 | Leone, Sr. ................ | 73/862.12 |
| 4,246,779 A | 1/1981 | Leone, Sr. | |
| 5,429,004 A | 7/1995 | Cruickshank | |
| 5,859,369 A | 1/1999 | Meyer et al. | |
| 6,405,585 B1 | 6/2002 | Hewitt | |

FOREIGN PATENT DOCUMENTS

| WO | WO 95/29392 | 11/1995 |
|---|---|---|
| WO | WO 99/12011 | 3/1999 |
| WO | WO 99/60363 | 11/1999 |

\* cited by examiner

*Primary Examiner*—Edward Lefkowitz
*Assistant Examiner*—Jonathan Dunlap
(74) *Attorney, Agent, or Firm*—Merchant & Gould P.C.

(57) ABSTRACT

The invention relates to the field of dynamometer drive adapters. In particular, the invention relates to dynamometer drive adapters for motorcycles.

15 Claims, 3 Drawing Sheets

DYNAMOMETER ADAPTER FOR MOTORCYCLES

FIELD OF THE INVENTION

The invention relates to the field of dynamometer drive adapters. In particular, the invention relates to dynamometer drive adapters for motorcycles.

BACKGROUND OF THE INVENTION

It is known from prior art that a motorcycle can drive a dynamometer via the tyre of its driven wheel. The tyre contacts a suitable roller, which is drivingly connected to the dynamometer. Although this method of driving a dynamometer has simplicity in its favour, it is neither particularly efficient nor are the results repeatable within narrow limits of accuracy. This variability is a result of using the tyre as the means of transmitting the power to the dynamometer. Variations in tyre carcass construction, tread pattern, tread compound and tyre pressure all contribute to power losses and variations, which in turn result in inaccurate power readings. These problems are exacerbated with the increase in power of the engine being tested, as it becomes increasingly difficult for the tyre contact patch to transmit the power without slipping.

An alternative system is described in U.S. Pat. No. 4,246,779. In this system the rear wheel of a motorcycle is removed and replaced by a shaft. Mounted on the shaft are two sprockets, the first for receiving power from the motorcycle engine via the motorcycle chain, the second for driving a second shaft attached to a dynamometer. The system is mounted in a support housing, so that the relative positions of the two shafts are fixed. This is problematic, in that the system cannot easily be attached to any motorcycle and any dynamometer, regardless of the heights of the dynamometer input and the motorcycle output. In particular, the output shaft of the system is positioned very close to the ground.

Furthermore, the system cannot accommodate belt drive motorcycles, or those with single sided swingarms. This system is not easily portable and has no inbuilt means for starting a motorcycle. Also, the system does not allow drive ratio changes between the two shafts.

SUMMARY OF THE INVENTION

It is an object of the invention to provide an adjustable adapter such that a variety of motorcycle output heights and a variety of dynamometer input heights can be accommodated.

It is a further object of the invention to provide an adjustable adapter, whereby a wide variety of motorcycle final drive configurations can be adapted to drive a dynamometer. The variety of motorcycle final drive configurations, which various embodiments of this present invention can accommodate, includes dual sided swingarms of any width, single sided swingarms, shaft drive, belt drive and chain drive.

A further object of the invention is to provide a dynamometer adapter allowing the changing of the drive ratio between the input and output of the adapter.

It is also an object of the invention is to provide a dynamometer adapter, which is portable and easily adjustable to suit a wide variety of motorcycle configurations.

A further object is to provide a dynamometer adapter having a means for starting an engine connected to the adapter.

Each object of the invention is to read disjunctively with the object of at least providing the public with a useful choice.

In a first aspect the invention provides an adapter for connecting a motorcycle to a dynamometer, including:

an input shaft adapted to be fixed to a motorcycle;

engagement means rotatably mounted on the input shaft and adapted to engage a drive element connected to an output of a motorcycle engine;

an output shaft adapted to connect to a dynamometer; and a transmission means adapted to transmit power from the engagement means to the output shaft;

wherein the input shaft is connected to the output shaft by one or more linkages, each linkage being pivotable around at least one of the input shaft and the output shaft, such that the relative positions of the input and output shafts can be adjusted and the adapter can connect to a motorcycle and a dynamometer, regardless of the relative heights of the motorcycle rear axle and the dynamometer input.

BRIEF DESCRIPTION OF THE DRAWINGS

The present invention will be described by way of example only, with reference to the accompanying drawings, in which.

DESCRIPTION OF THE INVENTION

Figure 1:
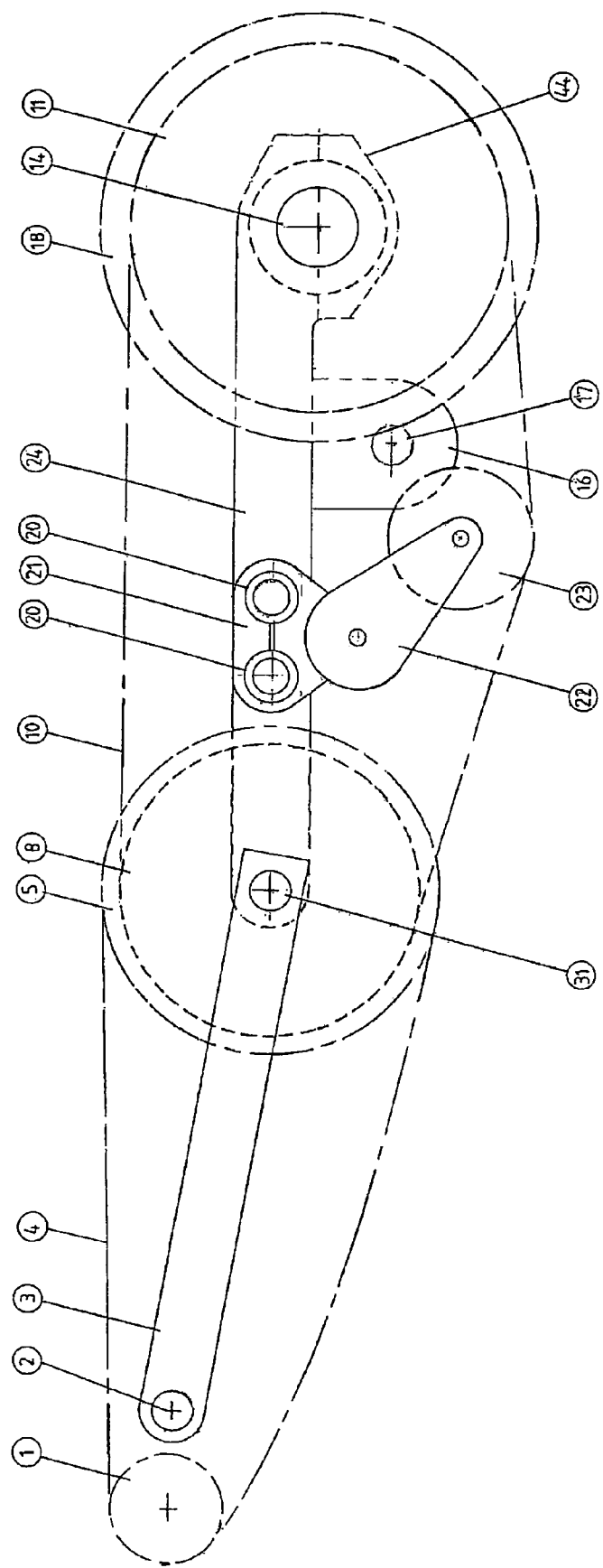
FIG. 1 is a side view of an adapter according to the invention.

While the operating principle of the present invention is identical for motorcycles with single sided swingarms and those with dual sided swingarms, some features are specific to each case.

In the case of a motorcycle with a dual sided swingarm, the rear wheel assembly is removed from the motorcycle and an adjustable length substitute axle is fitted. One end of the axle rotatably supports an input hub to which two sprockets are drivingly attached. The outer sprocket (or toothed drive-belt pulley) aligns with the output sprocket (or pulley) of the motorcycle engine and is driven by the motorcycle final drive chain (or toothed drive-belt).

The inner sprocket in turn aligns with and is drivingly connected by chain to the output hub-mounted sprocket, which is in turn concentric with and drivingly connected to, the output shaft. The output shaft is correctly positioned with respect to the substitute axle by the means of two parallel linkages. The two parallel linkages also provide support for an adjustable chain tensioner, a chain guard and an automotive type electric starter motor. The starter motor engages a ring gear, which is also drivingly connected to the output shaft. The end(s) of the output shaft are configured to suit the particular driving requirements of the particular dynamometer being used for the test.

In the case of a motorcycle with single sided swingarm, the rear wheel is removed from the motorcycle and the adapter is attached to the wheel drive spindle by the following means. A hollow input hub passes over the wheel drive spindle and is secured in place with a centralising conical washer and nut. Holes in the mating face of the hollow input hub drivingly engage with drive pegs, which protrude from the face of the motorcycle wheel drive spindle. A sprocket is drivingly connected to the hollow input hub which is rotatably supported in the end of a beam. This sprocket in turn aligns with and is drivingly connected by chain to the output hub-mounted sprocket, which is in turn drivingly connected to the output shaft.

The output shaft is correctly positioned with respect to the hollow input hub by the means of two parallel linkages, one of which is shorter than the other. The two parallel linkages provide support for an adjustable chain tensioner, a chain guard and an automotive type electric starter motor. The starter motor engages a ring gear, which is also drivingly connected to the output shaft, The end(s) of the output shaft are configured to suit the particular driving requirements of the particular dynamometer being used for the test.

In the case of motorcycles with shaft drive and either a dual sided or single sided swingarm, alternative configurations of the previous two embodiments can be used. The main differences being in the interface details of each type of input hub. Instead of being configured to drivingly engage with either a sprocket, a toothed belt or drive pegs, they are configured to drivingly engage with the output details of the shaft drive system being tested.

In all cases, when the engine being tested is fitted to a motorcycle frame, the rear wheel assembly must be removed from the motorcycle.

In the case of a motorcycle engine or similar type engine, not fitted to a vehicle, the engine is fitted to a suitable support frame. The support frame is configured in such a way as to allow the attachment of the present invention so that the engine being tested can drive a dynamometer.

With reference to the figures, the motorcycle output sprocket (or toothed drive pulley) 1 is drivingly connected to a chain (or toothed belt) 4 which in turn is drivingly connected to the input sprocket (or toothed pulley) 5 of the dynamometer adapter device. The motorcycle swingarm 3 whether it is single sided (FIG. 3) or dual sided (FIG. 2) is connected to the motorcycle and pivots at point 2.

In the case of a motorcycle with a dual sided swingarm (FIG. 2) the input sprocket (or toothed pulley) 5 of the dynamometer adapter device is attached to input hub 6 with fasteners 7. Also attached to input hub 6 with fasteners 7 is the output sprocket 8 which is aligned with drive sprocket 11 and is drivingly connected to it by means of drive chain 10. Drive sprocket 11 is attached by fasteners 12 to output hub 13 which is in turn drivingly connected to output shaft 14, the end(s) of which are configured to suit the particular requirements of the dynamometer 15 being used.

Output sprocket 8, drive sprocket 11 and drive chain 10 may be replaced by pulleys and a belt drive or any other suitable means for transmitting power.

Figure 2:
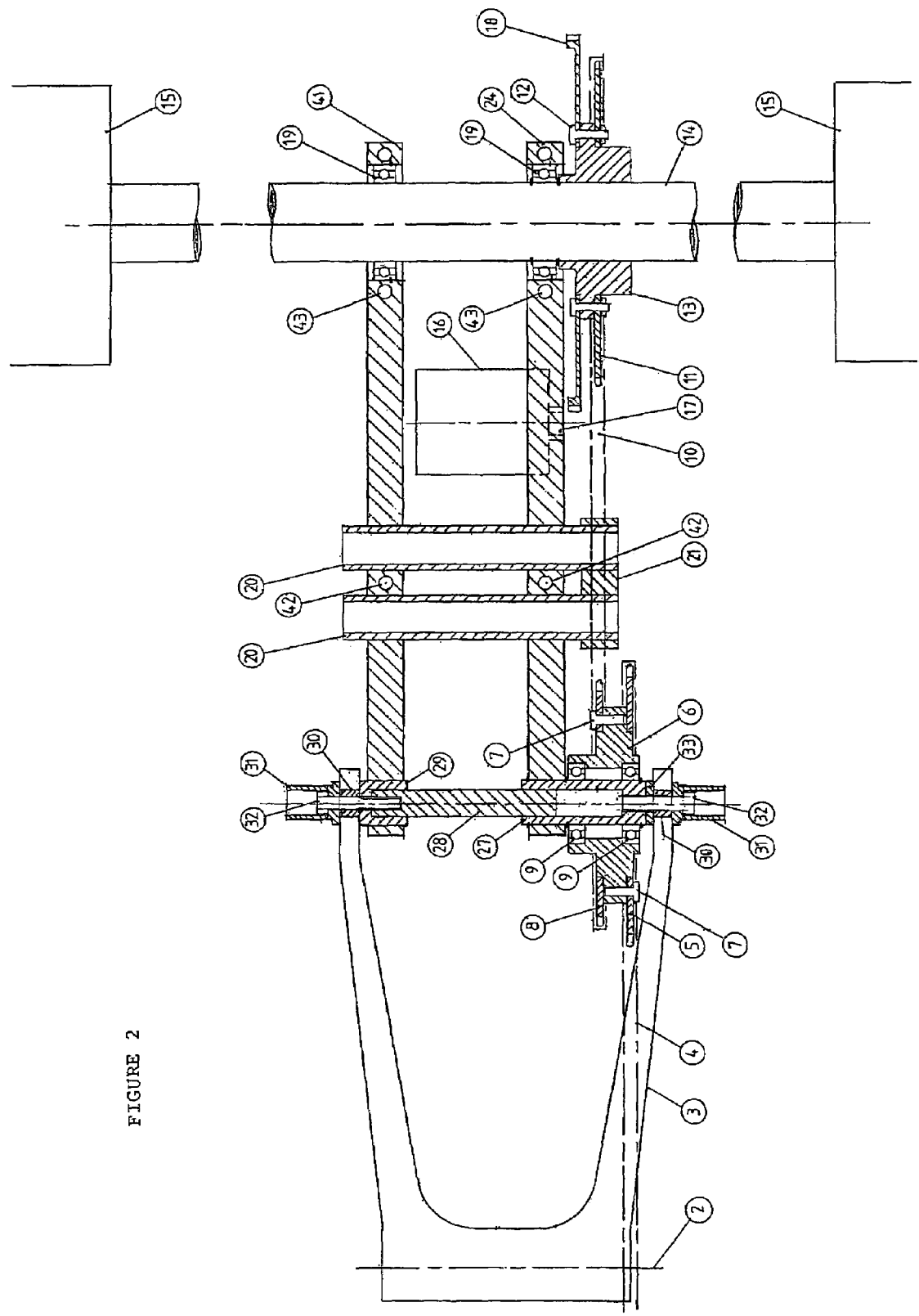
FIG. 2 is a plan view of a first embodiment of an adapter, according to the invention.

In FIG. 2 the input hub 6 is rotatably supported by bearings 9 on an adjustable input axle comprising drive side axle half 27, guide bar 28 and axle cup 29. Drive side axle half 27 is secured to the motorcycle swingarm by means of spacer 33, spacer 30, support boss 31 and fastener 32. Input hub 6 is axially located by means of circlips, as is drive side support beam 24 which is free to rotate on drive side axle half 27. Guide bar 28 and axle cup 29 are secured to the opposite side of the swingarm by means of spacer 30, support boss 31 and fastener 32. Guide bar 28 is free to slide axially within drive side axle half 27 while remaining coaxial with it. Thus, the length of the input axle can be adjusted to suit the width of the motorcycle's swingarm.

The non-drive side linkage, in the form of support beam 41, is free to move both axially and radially about axle cup 29. Thus, the linkage 41 is pivotable around the input axle. The correct alignment of input sprocket (or toothed pulley) 5 and motorcycle output sprocket (or toothed pulley) 1 is ensured by spacer 33. The width of spacer 33 is varied to suit different applications.

Figure 3:
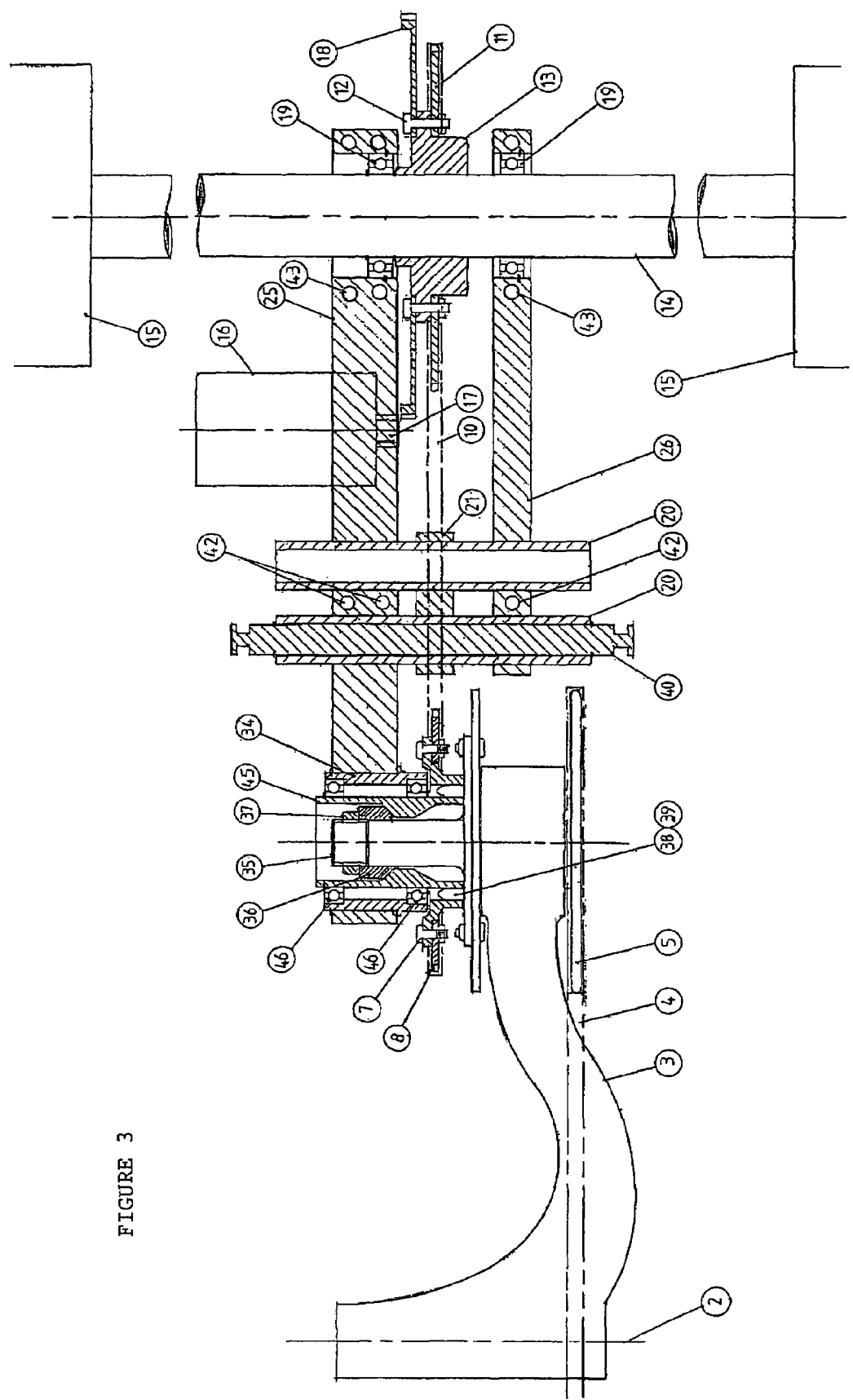
FIG. 3 is a plan view of a second embodiment of an adapter, according to the invention.

The output shaft 14 is correctly aligned with respect to the adjustable axle assembly by means of linkages in the form of support beams 24 and 41 in the case of a dual sided swingarm (FIG. 2) and support beams 25 and 26 in the case of a single sided swingarm (FIG. 3). In each of the above embodiments the support beams rotatably support the output shaft 14 by means of bearings 19. The bearings are constrained by caps 44 (FIG. 1), which are in turn secured by fasteners 43. The bearings 19 are axially retained within their respective bores by means of circumferential retaining rings. Also, in each case the bearing 19 adjacent to the output hub 13 is axially retained on the output shaft by two circlips, which engage grooves around the output shaft 14, one on each side of the bearing. Thus, the linkages are pivotable around the output shaft.

In each embodiment of the device, dual sided swingarm (FIG. 2) and single sided swingarm (FIG. 3), the support beams run parallel to each other. A pair of parallel locater tubes 20 pass through matching holes in each of the support beams. The bearing 19 in support beam 41 (FIG. 2) and bearing 19 in support beam 26 (FIG. 3) is free to move axially on output shaft 14. When the distance separating support beams 24 and 41 (FIG. 2) has been set to match the motorcycle swingarm width, or the distance separating support beams 25 and 26 (FIG. 3) has been set to provide sufficient torsional rigidity, fasteners 42 are tightened, thereby securing the locater tubes 20 and their respective support beams in a rigid assembly.

As illustrated in the FIG. 1, the parallel locater tubes 20 also provide location for an adjustable chain tensioner assembly. Tensioner sprocket 23 is rotatably mounted on a bearing, which is supported by adjustable arm assembly 22, which in turn pivots on mounting block 21. When the tensioner sprocket 23 is correctly aligned with the chain 10, a pinch-bolt fitted to mounting block 21 is used to lock the tensioner assembly in position onto locater tubes 20. When the correct chain tension has been set, the adjustable arm assembly 22 is locked in place on its mounting block 21, alternatively a spring activated automatic tensioner may be used. The purpose of the chain tensioner is to compensate both for normal chain wear and for changes in chain length when sprockets 8 and 11 are changed in order to match engine speed range with dynamometer speed range.

In the case of a motorcycle with single sided swingarm (FIG. 3) an input axle in the form of hollow input drive hub 45 passes over the motorcycle wheel drive spindle 35 and is secured in place with a centralising conical washer 36 and nut 37. Engagement means in the form of a clamping face connected to, or formed integrally with, the input axle includes holes 38 that drivingly engage with drive pegs 39, which protrude from the clamping face of the motorcycle wheel drive spindle 35. Output sprocket 8 is drivingly connected by fasteners 7 to the input axle 45, which in turn is rotatably supported by bearings 46 contained within housing 34. The housing 34 is pressed into main support beam 25 and is retained by means of a flange on one side and a circlip on the other. Output sprocket 8 is aligned with drive sprocket 11 and is drivingly connected to it by means of drive chain 10. Drive sprocket 11 is attached by fasteners 12 to output hub 13 which is in turn drivingly connected to output shaft 14, the end(s) of which are configured to suit the particular requirements of the dynamometer(s) 15 being used.

The functions of support beams 25 and 26, locater tubes 20 and chain tensioner are identical to those previously described.

Thus, the adapter for a double sided swingarm includes a non-rotating input axle, while the adapter for a single sided swingarm includes a rotating input axle. In the double sided case, the engagement means is rotatably mounted on a non-rotating axle, while in the single-sided case the engagement means is non-rotatably mounted on a rotating axle, such that the engagement means and axle rotate together. In the single-sided case the engagement means is preferably formed integrally with the input axle, and the phrase "mounted on" is intended to encompass this arrangement.

For motorcycle or motorcycle type engines that have no means of self starting, an automotive starter motor 16 is integrated with the dynamometer adapter device. The starter motor 16 is mounted on support beam 24 (FIG. 2), or support beam 25 (FIG. 3). Its pinion 17 engages a ring gear 18, which is attached by fasteners 12 to output hub 13. In use, the starter motor 16 drives the ring gear, thereby driving the chain 10 and the motorcycle drive belt or chain 4 and starting the motorcycle motor.

For reasons of safety, provision is made for attaching a chain guard (not illustrated) to support beam 24 (FIG. 2) and support beam 25 (FIG. 3).

The design of the present invention is such that when a motorcycle is being tested, the operator can be seated on the motorcycle and use all the controls in the normal way. Several means are provided whereby the motorcycle can be supported while its rear wheel is removed and it is attached to the dynamometer adapter device. Some motorcycles have small bobbins protruding outwards from the sides of their swingarms specifically for the purpose of engaging with a support stand when their rear wheel is removed. If so fitted, these bobbins may be used for the same purpose when the motorcycle is attached to dynamometer adapter device. If no such bobbins are fitted, then support bosses 31 (FIG. 2) or support bar 40 (FIG. 3) may be used in conjunction with a commercially available support stand.

As the linkages joining the input axle and output shaft are pivotable about both the input axle and output shaft, the adapter of the invention can be fitted to different motorcycles and dynamometers, over a range of relative heights of motorcycle output or rear axle and dynamometer inputs.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An adapter for connecting a motorcycle to a dynamometer, including:
   an input axle adapted to be fixed to a motorcycle in place of the motorcycle's rear wheel assembly;
   engagement means mounted on the input axle and adapted to engage a drive element connected to an output of a motorcycle engine;
   an output shaft adapted to connect to a dynamometer; and
   a transmission adapted to transmit power from the engagement means to the output shaft;
   wherein the input axle is connected to the output shaft by one or more linkages, each linkage being pivotable around the input axle and the output shaft, such that the relative positions of the input and output shafts can be adjusted and the adapter can connect to motorcycles and dynamometers, over a range of relative heights of the motorcycle rear axles and the dynamometer inputs.

2. An adapter as claimed in claim 1, wherein the motorcycle has a dual sided swingarm, and the input axle has an adjustable length and is adapted to be fixed to the motorcycle in place of the motorcycle's rear wheel assembly, over a range of widths of the motorcycle's dual sided swingarm and wherein the engagement means is rotatably mounted on the input axle.

3. An adapter as claimed in claim 2, wherein the input axle includes a first element that slides axially within a second element to adjust the length of the input axle.

4. An adapter as claimed in claim 1, wherein the motorcycle has a single sided swingarm and the input axle is adapted to fit over the motorcycle's rear wheel drive spindle and wherein the engagement means is non-rotatably mounted on the input axle.

5. An adapter as claimed in claim 1, wherein the engagement means is adapted to engage a drive element in the form of a chain.

6. An adapter as claimed in claim 1, wherein the engagement means is adapted to engage a drive element in the form of a belt.

7. An adapter as claimed in claim 1, wherein the engagement means is mounted on a hub; and
   the transmission means includes a first sprocket mounted on the hub such that it is driven by the engagement means, a second sprocket mounted on the output shaft, and a transmission chain engaging the first and second sprockets.

8. An adapter as claimed in claim 1 wherein each linkage is pivotable around both the input axle and the output shaft.

9. An adapter as claimed in claim 1, wherein at least one of the linkages is an adjustable linkage adjustably connected to the input axle and output shaft, such that its position in a direction parallel to the input axle and output shaft can be adjusted.

10. An adapter as claimed in claim 9, including one or more locking means for locking the position of the adjustable linkage in a direction parallel to the input axle and output shaft.

11. An adapter as claimed in claim 1 including a tension adjuster mounted to one or more of the linkages, wherein the tension adjuster includes a tension element that engages the transmission chain, and the tension of the transmission chain can be adjusted by adjusting the position of the tension element.

12. An adapter as claimed in claim 11, wherein the tension element is a tension sprocket.

13. An adapter as claimed in claim 1, including an automotive starter motor adapted to drive the transmission means, thereby driving the drive element to start the engine of the motorcycle.

14. An adapter as claimed in claim 1, wherein the output shaft is adapted to connect to two dynamometers, one at each end of the output shaft.

15. An adapter as claimed in claim 1, adapted to allow the drive ratio of the transmission means between the input axle and the output shaft to be altered to match the input speed range of the dynamometer.

* * * * *